Aug. 21, 1951 T. L. SHERMAN 2,565,272
POWER GAS GENERATOR, INCLUDING CRANKLESS ENGINE
Filed April 7, 1947
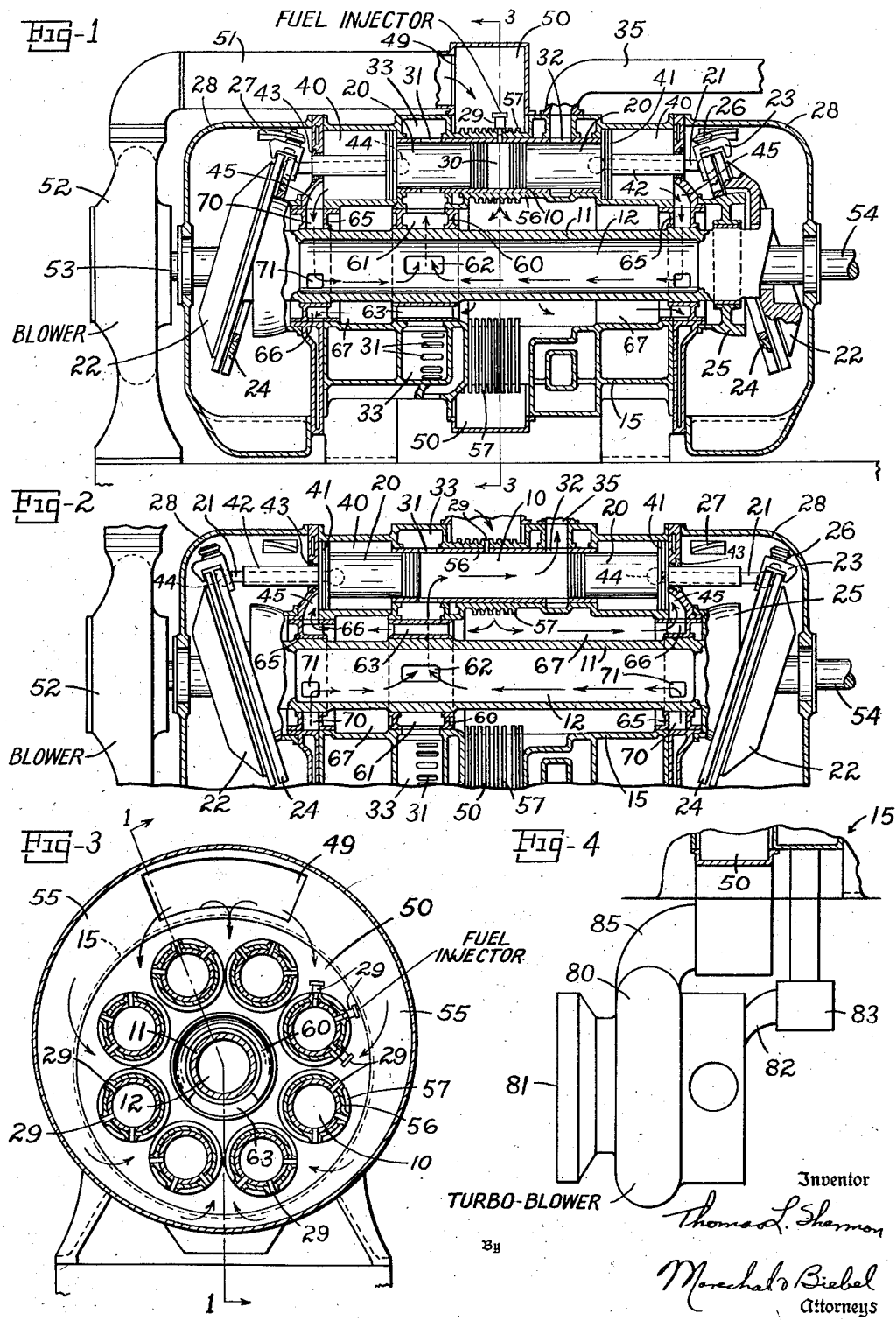

Patented Aug. 21, 1951

2,565,272

UNITED STATES PATENT OFFICE 2,565,272

POWER GAS GENERATOR, INCLUDING CRANKLESS ENGINE

Thomas L. Sherman, Springfield, Ohio, assignor to The Steel Products Engineering Company, Springfield, Ohio, a corporation of Ohio Application April 7, 1947, Serial No. 739,973

7 Claims. (Cl. 123—58)

This invention relates to apparatus for generating power gas.

One of the principal objects of the invention is to provide a power gas generator of simple and compact construction, with minimum size and weight for a given capacity, which will operate with high efficiency.

An additional object is to provide a power gas generator wherein the intake for the charging air supplied to the apparatus is constructed and arranged to give maximum passage area and corresponding minimum gas flow velocity, contributing to high efficiency operation.

Another object is to provide a power gas generator wherein the gases generated by combustion are expanded in the combustion chamber under controlled conditions such that their temperature is reduced to a range enabling the turbine to which they are supplied to operate under favorable temperature conditions and wherein also the energy released by this expansion of the gases is utilized to drive the compressor, reducing to a minimum both the quantity of air required by the system and the expenditure of power required for operation of the compressor and developing a maximum efficiency.

It is also an object of the invention to provide apparatus for generating power gas wherein the heat radiated from the walls of the combustion chambers is utilized to preheat the charging air supplied to the compressor to provide improved thermal efficiency.

A further object is to provide a power gas generator adapted for operation in conjunction with a blower or other auxiliary compressor for preliminary compression of the charging air and which is of such construction and arrangement as to facilitate a closely coupled operative connection with such auxiliary compressor for driving the compressor by either direct mechanical connection therewith or through a turbine driven by gas taken from the main power output of the generator.

Still another object is to provide a power gas generator having a plurality of power cylinders and compression cylinders symmetrically arranged about a central position and having also an intake chamber located at this central position to receive charging air and to distribute such air equally and directly to the compression cylinders for compression and subsequent passage to the power cylinders.

A still further object of the invention is to provide a power gas generator having the above operating characteristics and including a crankless internal combustion engine wherein the power pistons and compression pistons operate in conjunction with a rotating slant or swash plate.

Other objects and advantages of the invention will be apparent from the following description, the accompanying drawing and the appended claims:

In the drawing:

Fig. 1 is a view partly in elevation and partly in longitudinal section illustrating apparatus for generating power gas in accordance with the present invention and provided with a mechanically driven charging blower, the view being taken substantially on the line 1—1 of Fig. 3;

Fig. 2 is a fragmentary view similar to Fig. 1 showing the relation of the moving parts after 180° rotation of the slant shaft from the position shown in Fig. 1;

Fig. 3 is a transverse section taken on the line 3—3 of Fig. 1; and

Fig. 4 is a fragmentary view illustrating the operation of the generator of Fig. 1 in conjunction with an auxiliary compressor in the form of a turbo-blower.

In a simple form of gas turbine arrangement air is supplied by a blower or other charging compressor to a chamber into which fuel is injected and wherein combustion takes place. The products of combustion pass directly to a gas turbine which not only provides the useful power but also drives the charging compressor. However, if large quantities of air are supplied in order to keep down the combustion temperature to within a range which the turbine blading can withstand, the power required by the compressor may become excessively large, and in consequence, such simple gas turbine arrangements are relatively inefficient.

In accordance with the present invention, there is provided a power gas generator which includes in a single unit both a compressor and a combustion chamber which serves not only to generate the desired power gas but also to provide the energy for direct operation of the compressor. More particularly, the invention provides a power gas generator having multiple power cylinders and compression cylinders arranged in symmetrically spaced relation, and wherein pistons actuated by combustion of fuel in the power cylinders serve to produce reciprocating motion of other pistons in the compression cylinders. The output of these compression cylinders is conducted through the power cylinders for scavenging and charging purposes and thereafter passes to exhaust as part of the power gas output.

In the apparatus of the invention, the compression cylinders and power cylinders are arranged about a central position at which there is located an intake chamber for the air to charge the compression cylinders, thus providing for direct distribution of this air to all the compression cylinders. In addition, the apparatus is so constructed and arranged that this charging air flows over the outer walls of the power cylinders and thus absorbs the heat of combustion radiated from these cylinder walls, thereby both preheating the charging air and minimizing loss or waste of the heat energy developed in the apparatus by utilizing heat which would otherwise be lost.

The preferred embodiment of the present invention illustrated in the drawing includes a crankless internal combustion engine wherein each power cylinder is provided with a pair of opposed pistons arranged for reciprocating motion in cooperation with rotating slants or swash plates. Adjacent each end of each power cylinder, there is a compression cylinder having a coacting piston mechanically connected with the adjacent power piston for reciprocating motion in response to the similar motion of the power piston.

In the operation of this apparatus, combustion takes place substantially at the center of each of the power cylinders, so that the pistons therein move apart axially on their firing strokes and cause similar motion of the connected compression pistons in the compression cylinders. An annular chamber is provided at the middle of the apparatus and surrounding the slat shaft, and it is arranged to receive charging air either from the outside atmosphere, or preferably from a charging blower or other auxiliary compressor, and to supply this charging air through suitably valved passages to the compression cylinders. After further compression in the compression cylinders, this air is conducted through additional valved passages to a chamber within the hollow slat shaft and thence to and through the power cylinders to exhaust, the valves controlling these passages being carried by the slat shaft for operation in coordinated relation with the pistons.

The use of an auxiliary compressor to provide initial compression of the charging air makes it possible to construct a substantially more compact apparatus for a given capacity than would be the case for such a machine designed to utilize charging air at atmospheric pressure, since substantially larger compression cylinders and pistons would be required to produce the same ultimate output. In addition, a crankless engine of the type illustrated is particularly adapted for direct driving connection with different types of auxiliary compressors, such as a mechanically driven axial or centrifugal blower, which may be operated directly by an extension of the slant shaft, or a turbo-blower which can be served by a bleed from the exhaust manifold.

Referring to the drawing, and more particularly to Figs. 1 to 3, the apparatus includes a plurality of power cylinders 10 circumferentially arranged about a hollow central shaft 11, there being eight of these cylinders shown in Fig. 3 although this number may be varied in accordance with the desired size and capacity of the apparatus. The shaft 11 is hollow over the major central portion of its length, thus forming a chamber 12 therein as shown in Figs. 1 to 3, and it is supported for rotation within the main casing or housing 15 of the apparatus.

Each power cylinder 10 is provided with a pair of opposed power pistons 20 adapted for reciprocation in opposite directions parallel to shaft 11 and connected through suitable piston rods 21 and bridges 23 to the slants or swash plates 22 secured to shaft 11 adjacent each end of the apparatus. As shown in Figs. 1 and 2, each swash plate 22 is provided with a cooperating cage 24 mounted for oscillating movement on a spherically curved mount 25 secured to the engine block or housing 15. Each bridge 23 carries a roller 26 cooperating with suitable guides 27 for controlling the movement of the cage to provide a lemniscate motion thereof. This construction and arrangement of the cage, guides and swash plate is similar to that shown and described in applicant's copending application, Serial No. 652,737, filed March 7, 1946, now Patent No. 2,745,295 granted July 5, 1949, and assigned to the same assignee as this application, and these parts are shown as enclosed within suitable housings 28 secured to the main housing 15.

Each cylinder 10 includes a combustion chamber 30 positioned substantially centrally thereof into which fuel is injected as indicated at 29 for combustion in accordance with the usual operation of opposed-piston engines. A conventional fuel injector nozzle being shown somewhat diagrammatically in Figs. 1–3. At either side of this combustion chamber 30, each cylinder 10 is provided with one or more scavenging and charging ports 31 and exhaust ports 32 arranged for properly timed opening and closing by the pistons 20. The scavenging ports 31 all connect with an annular manifold chamber 33 as shown in Figs. 1 and 2, and the exhaust ports 32 are shown as provided with a suitable pipe 35 for conducting the hot exhaust gases away for subsequent use, as in a gas turbine, not shown. It will thus be seen that with this construction, when combustion takes place within the combustion chamber 30 of each cylinder 10, the pistons 20 will move apart axially to uncover ports 31 and 32 in properly timed relation, and this motion of the pistons will be translated through the cages and swash plates into rotating movement of the shaft 11.

Referring to Figs. 1 and 2, the apparatus also includes a plurality of compression cylinders 40 arranged adjacent opposite ends of the power cylinders 10, there being one of these compression cylinders 40 adjacent each end of each power cylinder and coaxial therewith. Each compression cylinder 40 is provided with a coacting piston 41 operatively connected with the adjacent power piston 20 for similar reciprocating motion. As shown in Fig. 1, each compression piston 41 is secured to the axially outer end of its adjacent power piston 20 and is provided with a sleeve 42 which encloses the piston rod 21 and reciprocates in a pressure sealing gland 43, this sleeve being of larger internal diameter than the outer diameter of its associated piston rod 21 in order to permit angular movement of the rods 21 incident to the reciprocating movement of the power piston and the oscillating movement of the cage 24 as it travels in its lemniscate path. As shown, a ball and socket joint 44 is provided at each end of the piston rods 21 to accommodate such movement while the sleeve 42 has a simple reciprocating movement.

Each compression cylinder 40 is also provided with a port 45 adjacent one or both ends thereof to provide for the intake and discharge of pressure fluid. The drawing shows one of these ports 45 as provided at the outer end of each cylinder 40, but it will be apparent that a similar port may be provided at the inner end of each of these cylinders in a manner similar to that shown, for example, in applicant's Patent Number 2,479,876 and assigned to the same assignee as this application. These ports are controlled in proper sequence by rotary valves carried by the slant shaft 11, as described hereafter. The cylinders 40 may be circular in cross-section or may be sector-shaped as described and shown in said patent.

In the use of this apparatus as shown, charging air is supplied to each compression cylinder during the compression stroke of its associated power piston. Thereafter, and on the firing stroke of its associated power piston, the air in the compression cylinder is compressed and conducted through suitable valves and the chamber 12 within the slant shaft to the scavenging ports of the power cylinders, to scavenge these cylinders and then to be vented to exhaust along with the products of combustion. The charging air may be at atmospheric pressure, but if it is subjected to some initial compression it is possible to contruct the apparatus with smaller compression cylinders and still obtain the same capacity as in a larger apparatus utilizing charging air at atmospheric pressure. Accordingly it is desirable to provide an auxiliary compressor for supplying charging air under super-atmospheric pressure.

Referring to Figs. 1 to 3, an annular intake chamber 50 for charging air is positioned substantially centrally and radially of the apparatus and between the planes of the scavenging and exhaust ports of the power cylinders. This intake chamber has an inlet aperture 49 connecting with a supply pipe 51 leading from an auxiliary compressor 52, shown as a blower positioned adjacent one end of the apparatus and driven mechanically by an extension 53 of the slant shaft 11 as illustrated in Figs. 1 and 2. A further charging blower may be positioned at the opposite end of the apparatus and driven by the extension shaft 54, and these extension shafts also provide convenient mechanical power take-offs for operating other auxiliary equipment, such as pumps, governors, starting apparatus, etc.

It will be noted in Fig. 3 that although chamber 50 is circular and has its axis parallel to that of slant shaft 11, it is arranged in eccentric relation with the central shaft, thus forming passages 55 of decreasing cross-sectional area on opposite sides of the casing or housing 15 as shown in Fig. 3. Also, its inlet aperture 49 is located at a position on the opposite side of the chamber axis from the axis of shaft 11 and hence at the larger ends of the passages 55, thus providing in effect a tapering flow path for air entering chamber 50 through this inlet 49 and assuring substantially uniform flow velocities across the chamber and to the compression cylinders.

Figs. 1 to 3 also illustrate how the apparatus may be constructed and arranged to preheat the charging air in intake chamber 50 before it is supplied to the compression cylinders. As shown, the power cylinders 10 extend axially through the intake chamber 50, and since this chamber is located substantially centrally of the apparatus, this results in positioning the outer walls of the combustion chambers 30 within the chamber 50 and hence in heat exchanging relation with the charging air therein as it flows over these cylinder walls. This arrangement thus not only provides for preheating the charging air but accomplishes this result by utilizing some of the heat of combustion which would otherwise be lost. There is a thermodynamic advantage in this arrangement which substantially increases the overall efficiency of the apparatus, and in order to facilitate this result and this desired exchange of heat, jackets 56 surrounding the combustion chambers may be provided with external fins 57 as shown in Figs. 1 to 3 to increase their heat radiating surfaces in contact with the charging air.

As pointed out, the course of the charging air from intake chamber 50 as it passes through the apparatus is controlled by rotary valves carried by the slant shaft 11. Three such valves are shown. The valve 60 controls communication from the chamber 12 within the slant shaft to the manifold chamber 33 and the scavenging ports 31 of power cylinders 10. Valve 60 is accordingly provided with a radially arranged port or duct 61 which cooperates with one or more ports 62 in the wall of shaft 11 to connect the chamber 12 with the chamber 33, the port or ports 62 being positioned in the plane of scavening ports 31 as shown in Figs. 1 and 2. This valve 60 is also provided with a passage or duct 63 arranged on its side opposite port 61 and parallel with the axis of shaft 11 to provide passage for the charging air to the compression cylinders 40 at the end of power cylinders 10 adjacent the scavenging ports.

The other two rotary valves 65 are mounted adjacent the outer ends of compression cylinders 40 and control the flow of air from intake chamber 50 to these cylinders and from these cylinders to the chamber 12, which is thus the discharge chamber for the compression cylinders. Each of the valves 65 is accordingly provided with two ports or ducts as shown in Figs. 1 and 2. One port 66 is effective during the compression stroke of each power piston to connect the port 45 of its associated compression cylinder 40 with the adjacent annular space 67 which forms a conduit for charging air from intake chamber 50, thus permitting this air to flow into and charge the compression cylinders in proper sequence. The other ports 70 of valves 65 are oppositely located and are effective during the firing stroke of each pair of power pistons to connect the ports 45 of their associated compression cylinders with the ports 71 in the wall of shaft 11 which lead into the discharge chamber 12.

Figs. 1 and 2 illustrate the sequence of operation of the apparatus as described. In Fig. 1, the two upper power pistons 20 are shown at the inner limits of their compression strokes and hence ready for firing, and with the corresponding compression pistons 41 similarly in their innermost positions relative to cylinders 40. The rotary valves 65 are accordingly in such position that the ports 70 therein are in register with the ports 45 of the cylinders 40 shown in Fig. 1 to conduct the output of these cylinders 40 through ports 71 to chamber 12 during the subsequent firing stroke of pistons 20. Conversely, the ports 66 of valves 65 are out of register with ports 45 of the cylinders 40, to prevent the output of these cylinders 40 from returning to chamber 50.

It will be understood that since cylinders 10 fire in rotation, the pistons 20 and 41 in the other cylinders 10 and 40, respectively, not seen in Fig. 1 are in relatively different positions, some moving outwardly on their firing strokes and others moving inwardly on their compression strokes. Thus referring to Fig. 3, the power pistons in the three cylinders 10 adjacent on the clockwise side to the cylinder 10 through which the section line 1—1 passes, will be on their compression strokes, assuming a clockwise rotation of shaft 11 as viewed in Fig. 3, the power pistons in the cylinder 10 directly opposite the cylinder through which the section line passes will be at their outermost positions, corresponding with the positions shown in Fig. 2, and in the remaining three cylinders 10, the pistons 20 will be on their firing strokes. Accordingly, it will be seen that the valve ports 66 and 70 are of such angular extent that the ports 66 will be in register with the ports 45 of the compression cylinders associated with the four power cylinders 10 adjacent on the clockwise side in Fig. 3 to the cylinder 10 through which the section line passes, and the ports 70 will be in register with the ports 45 of the remaining three pairs of compression cylinders.

The arrows in Fig. 1 illustrate the flow of air through the apparatus with the parts in these relative positions. As shown, the charging air flows into the intake chamber 50 from the pipe 51 and charging blower 52, and from the chamber 50 it is distributed equally and in both directions axially outwardly by means of the conduit spaces 67 and the passage 63 in the valve 60. The spaces 67 and chamber 50 thus cooperate to provide maximum passage area and hence minimum velocity of flow of charging air within the apparatus, and the tapered arrangement of chamber 50 as described and shown in Fig. 3 further cooperates in maintaining a uniform velocity flow.

The charging air is accordingly conducted through the valve ports 66 into the compression cylinders 40 with which these valve ports are in register as described to charge these cylinders. At the same time, the compression cylinders 40 whose associated power pistons are moving outwardly on their firing strokes will have their ports 45 in register with the valve ports 70, and the air compressed in these cylinders will accordingly pass through ports 70 and thence through the ports 71 into the discharge chamber 12 within the shaft 11. From this chamber 12, the compressed air will pass through the port 62 in the shaft wall and through the port 61 in the valve 60 into the manifold chamber 33 and thence through the scavenging ports 31 into those power cylinders 10 whose pistons 20 have moved sufficiently far axially to uncover the ports 31 therein. This air will thus scavenge the power cylinders and be vented through the exhaust ports 32 and pipe 35 with the products of combustion from the power cylinders, except for a proportion thereof which is retained in the combustion chamber for mixing with the next charge of fuel.

When firing takes place in the combustion chamber 30 of the illustrated power cylinder 10, the expanding gases will force the pistons 20 therein axially apart, carrying with them their associated compression pistons 41. This motion will be translated through swash plates 22 into rotary movement of shaft 11, which will thus carry valves 65 into proper sequentially registering relation with ports 45 as described, and when the pistons move sufficiently to uncover exhaust ports 32, the excess energy in the exhaust gas passes off through the pipe 35. Thus only that proportion of the heat energy supplied by the combustion of the fuel necessary for compressing the charging air is spent in the gas generator, and the remainder goes to the turbine. At the same time, since the gases in the combustion chamber expand with the movement of the power pistons, they are able to lose some of their heat and so reach the turbine at a temperature enabling the latter to operate under favorable temperature conditions, thus obviating the need for the provision of excess cooling air in the system.

Fig. 2 illustrates the relative positions of the parts after the above operations have taken place in the upper cylinders and after 180° rotation of the slant shaft 11 from the position shown in Fig. 1. As noted, the swash plates 22 have reversed their positions, and the pistons 20 and 41 are each at their outermost limits of axial travel. The valves 65 have rotated to such position that the ports 66 therein are now in register with the illustrated cylinder ports 45 preparatory to charging these cylinders during the compression strokes of their associated power pistons. Similarly, the valve ports 70 have moved out of register with the cylinder ports 45 shown in Fig. 2, these valve ports 70 being now in position to conduct the output of other cylinders 40 to the discharge chamber 12. Fig. 2 also shows the power pistons 20 as having moved past and thus opened the scavenging ports 31 and the exhaust ports 32 of the upper power cylinder 10, and the arrows in Fig. 2 indicate the passage of the scavenging air from the manifold chamber 33 through the combustion chamber of the power cylinder and out through the exhaust ports 32 and exhaust pipe 35. It will be understood that this sequence of operations will take place in rotation in each power cylinder and its associated compression cylinders, thus providing a continuous output of power gas from the exhaust of the apparatus.

It will accordingly be seen that the invention provides a simple and compact apparatus for generating power gas which will have substantial advantages in operation. The individual parts of the apparatus are of simple construction, thus making possible production at comparatively low cost. In addition the invention provides maximum output for apparatus of a given size and capacity, with minimum loss or diversion of power for operation of the compressor. A further advantage in operation is the ready control of timing with respect to charging and exhausting of the power cylinders, by arranging the two slants or swash plates in out-of-phase relation to control the sequence of opening and closing the scavenging and exhaust ports of each power cylinder. It will also be noted that with the apparatus of the present invention, the output of power gas is readily controlled by variation of the speed of operation through control of the supply of fuel to the power cylinders.

A further advantageous feature of this apparatus is its adaptability to simple and efficient operation with different types of auxiliary compressors. Thus in Figs. 1 and 2 the apparatus is shown as operating in conjunction with a mechanically driven charging blower 52, but it is equally adaptable for operation with a turbo-blower operated by gas bled from the main power gas output. Such an arrangement is illustrated in Fig. 4, which shows a turbo-blower 80 having an air intake 81 and having its power intake 82 connected with the exhaust manifold 83 of a generator constructed as shown in Fig. 1. This turbo-blower 80 also has its air discharge 85 connected with the intake chamber 50 of the generator, and it will be seen that the central positioning of the intake chamber 50 thus provides for a closely coupled operative connection to the turbo-blower 80. It will be understood that the blower 80 may be positioned on top of the generator or at any other convenient location, and that when it is used, the mechanically driven blower 52 may not be required but the operation of the rest of the apparatus remains the same.

It should also be noted that when either of these charging blower arrangements is employed, there is a balanced cycle. The turbine is free, and the amount of heat energy transferred to the mechanism of the generator is equivalent to the work of the charging blower and the compressor. On the other hand, such a balanced cycle is not essential, and the extension 54 of the main slant shaft may be provided with a geared or other direct driving connection with the main turbine, as by mounting directly on the shaft extension 54 in the same manner as shown for the blower 52 on the shaft extension 53. With such an arrangement, some energy may be transmitted through the slant shaft extension, thus affording additional advantages for the system as a whole.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for generating power gas comprising a plurality of power cylinders arranged in symmetrically spaced and parallel relation about a central shaft, a plurality of compression cylinders positioned adjacent opposite ends of said apparatus, power pistons in said power cylinders, a swash plate on said shaft cooperating with said pistons to cause rotary motion of said shaft in response to reciprocating motion of said pistons, compression pistons in said compression cylinders, means operatively connecting each said compression piston with one of said power pistons, means forming an intake chamber adjacent said central position and substantially equidistant from said compression cylinders for receiving charging air for said compression cylinders, and conduit means arranged to provide a flow of air axially of said apparatus in both directions from said intake chamber to said compression cylinders.

2. Apparatus for generating power gas comprising a plurality of power cylinders circumferentially arranged about a central shaft, power piston in said power cylinder, a swash plate on said shaft cooperating with said pistons to cause rotary motion of said shaft in response to reciprocating motion of said pistons, each said power cylinder including a combustion chamber at substantially its mid-portion, a plurality of compression cylinders arranged adjacent opposite ends of said power cylinders and operatively connected with said power pistons, means forming an intake chamber positioned substantially centrally of said apparatus for receiving charging air for said compression cylinders, said power cylinders extending axially through said intake chamber and having the outer walls of said combustion chambers therein in heat exchanging relation with the interior of said intake chamber, conduit means arranged to provide a flow of air axially of said apparatus in both directions from said intake chamber, and valves providing controlled communication from said conduit means to said compression cylinders.

3. Apparatus for generating power gas comprising a plurality of power cylinders circumferentially arranged about a central shaft, a plurality of compression cylinders adjacent opposite ends of said power cylinders, power pistons in said power cylinders, a swash plate on said shaft cooperating with said pistons to cause rotary motion of said shaft in response to reciprocating motion of said pistons, compression pistons in said compression cylinders, means forming an annular intake chamber positioned substantially centrally of said apparatus for receiving charging air for said compression cylinders, means forming an annular conduit providing for the flow of air axially of said apparatus in both directions from said intake chamber, valves providing controlled communication from said conduit to said compression cylinders, means forming a discharge chamber arranged within said annular conduit, and valves providing controlled communication from said compression cylinders to said discharge chamber and from said discharge chamber to said power cylinders.

4. Apparatus for generating power gas comprising a generally cylindrical casing, a plurality of power cylinders and a plurality of compression cylinders circumferentially arranged within said casing and about the central axis thereof, compression piston in said compression cylinders, power pistons in said power cylinders for operating said compression cylinders, a shaft located on said axis, a swash plate on said shaft cooperating with said power pistons to cause rotary motion of said shaft in response to reciprocating motion of said power pistons, means forming an annular intake chamber for charging air extending radially outwardly of and eccentrically located with respect to said casing forming passages of decreasing cross-sectional area on opposite sides of said casing, valves providing controlled communication from said intake chamber to said compression cylinders and from said compression cylinders to said power cylinders, and means forming an inlet for charging air to said intake chamber at the larger ends of said passages to provide for substantially uniform velocity flow of air from said intake chamber to each of said compression cylinders.

5. Apparatus for generating power gas comprising a generally cylindrical casing, a plurality of power cylinders circumferentially arranged within said casing and about the central axis thereof, a plurality of compression cylinders adjacent opposite ends of said power cylinders, compression piston in said compression cylinders, power pistons in said power cylinders for operating said compression cylinders, a shaft located on said axis, a swash plate on said shaft cooperating with said power pistons to cause rotary motion of said shaft in response to reciprocating motion of said power pistons, means forming an annular intake chamber for charging air positioned substantially equidistant from said compression cylinders but eccentrically located with respect to said casing to form passages of decreasing cross-sectional area on opposite sides of said casing, conduit means arranged to provide a flow of air axially of said apparatus in both directions from said intake chamber to said compression cylinders, and means forming an inlet for charging air to said intake chamber at the larger ends of said passages to provide for substantially uniform velocity flow of air to each of said compression cylinders.

6. Apparatus for generating power gas comprising a central shaft, a plurality of power cylinders circumferentially arranged about said shaft, power pistons in said power cylinders, a swash plate on said shaft cooperating with said pistons to cause rotary motion of said shaft in response to reciprocating motion of said pistons, a plurality of compression cylinders arranged adjacent opposite ends of said power cylinders, compression pistons in said compression cylinders, means operatively connecting each said compression piston with one of said power pistons, means forming an annular intake chamber for receiving charging air for said compression cylinders, said chamber being positioned surrounding said shaft and substantially centrally of said apparatus to supply a flow of said air axially outwardly therefrom in both directions to said compression cylinders, and valves operable in coordinated relation with said power pistons for controlling communication from said intake chamber to said compression cylinders and from said compression cylinders to said power cylinders.

7. Apparatus for generating power gas comprising a hollow central shaft, a plurality of power cylinders circumferentially arranged about said shaft, power pistons in said power cylinders, a swash plate on said shaft cooperating with said pistons to cause rotary motion of said shaft in response to reciprocating motion of said pistons, a plurality of compression cylinders arranged adjacent opposite ends of said power cylinders, compression pistons in said compression cylinders, means operatively connecting each said compression piston with one of said power pistons, means forming an annular intake chamber for receiving charging air for said compression cylinders, said chamber being positioned surrounding said shaft and substantially centrally of said apparatus to supply a flow of said air axially outwardly therefrom in both directions to said compression cylinders, valves operable in coordinated relation with said power pistons for controlling communication from said intake chamber to said compression cylinders, said hollow shaft having a discharge chamber therein for said compression cylinders, and additional valves operable in coordinated relation with said power pistons providing controlled communication from said compression cylinders to said discharge chamber and from said discharge chamber to said power cylinders.

THOMAS L. SHERMAN.

REFERENCES CITED

The following references are of record in the file of this patent:

UNITED STATES PATENTS

| Number | Name | Date |
|---|---|---|
| 933,906 | Illy | Sept. 14, 1909 |
| 1,006,907 | Büchi | Oct. 24, 1911 |
| 1,119,432 | Kerscht | Dec. 1, 1914 |
| 1,145,820 | Summeril | July 6, 1915 |
| 1,168,877 | Froehlich | Jan. 18, 1916 |
| 1,281,644 | Ostergren | Oct. 15, 1918 |
| 1,445,319 | Jelbart | Feb. 13, 1923 |
| 1,670,355 | Harris | May 22, 1928 |
| 1,818,283 | Spencer | Aug. 11, 1931 |
| 1,904,499 | McLaren | Apr. 18, 1933 |
| 1,961,905 | Michell | June 5, 1934 |
| 2,182,213 | Redrup | Dec. 5, 1939 |
| 2,354,620 | Smith | July 25, 1944 |

FOREIGN PATENTS

| Number | Country | Date |
|---|---|---|
| 511,261 | Germany | Nov. 3, 1930 |

Certificate of Correction

Patent No. 2,565,272 August 21, 1951

THOMAS L. SHERMAN

It is hereby certified that error appears in the printed specification of the above numbered patent requiring correction as follows:

Column 3, line 46, for "slat" read *slant*; column 4, line 19, for the patent number "2,745,295" read *2,475,295*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*